US012762834B2

(12) United States Patent
Karlsson et al.

(10) Patent No.: US 12,762,834 B2
(45) Date of Patent: Oct. 13, 2026

(54) AIR DRAG OF A VEHICLE

(71) Applicant: Volvo Truck Corporation, Gothenburg (SE)

(72) Inventors: Robin Karlsson, Kungälv (SE); Hampus Ek, Torslanda (SE)

(73) Assignee: Volvo Truck Corporation, Gothenburg (SE)

(*) Notice: Subject to any disclaimer, the term of this patent is extended or adjusted under 35 U.S.C. 154(b) by 337 days.

(21) Appl. No.: 18/401,852

(22) Filed: Jan. 2, 2024

(65) Prior Publication Data

US 2024/0233329 A1 Jul. 11, 2024

(30) Foreign Application Priority Data

Jan. 9, 2023 (EP) .................................... 23150774

(51) Int. Cl.
*G06V 10/764* (2022.01)
*G06V 10/98* (2022.01)
*G07C 5/08* (2006.01)

(52) U.S. Cl.
CPC .......... *G06V 10/764* (2022.01); *G06V 10/993* (2022.01); *G07C 5/0808* (2013.01); *G06V 2201/08* (2022.01)

(58) Field of Classification Search
CPC ............... G06V 10/764; G06V 10/993; G06V 2201/08; G07C 5/0808; B60W 50/14; B60W 2050/146; B60W 2420/403; B60W 40/1005; B60W 2050/0031; B60W 2530/16
USPC .................................................. 382/104, 159
See application file for complete search history.

(56) References Cited

U.S. PATENT DOCUMENTS

| | | | | |
|---|---|---|---|---|
| 2020/0148216 | A1* | 5/2020 | Garcia Ramirez | B60R 16/0236 |
| 2020/0198647 | A1* | 6/2020 | Frederick | B60W 40/1005 |
| 2022/0105934 | A1* | 4/2022 | Shieh | B60W 40/1005 |
| 2022/0237952 | A1* | 7/2022 | Biberstein | G06N 3/09 |
| 2023/0069732 | A1* | 3/2023 | Aggoune | B60W 50/14 |
| 2023/0385489 | A1* | 11/2023 | Askerdal | B60W 40/1005 |

OTHER PUBLICATIONS

S. Li, C. Cao, L. Song, L. Tian, L. Zhang and J. Ma, "Efficient Prediction of Vehicle Drag Coefficient Using Physics-Enhanced DeepONet," 2025 IEEE 7th International Conference on Communications, Information System and Computer Engineering (CISCE), Guangzhou, China, 2025, pp. 234-240 (Year: 2025).*

(Continued)

*Primary Examiner* — Kathleen Y Dulaney
(74) *Attorney, Agent, or Firm* — Withrow & Terranova, PLLC

(57) ABSTRACT

A computer system comprising a processor device configured to obtain at least one image of a vehicle, wherein the at least one image comprises at least one air drag affecting portion of the vehicle affecting the air drag of the vehicle, estimate an air drag of the vehicle comprising the at least one air drag affecting portion using a machine learning algorithm, identify the at least one air drag affecting portion in the at least one image, and to estimate an impact that the at least one air drag affecting portion has on the vehicle's air drag and energy consumption.

12 Claims, 4 Drawing Sheets

(56) References Cited

OTHER PUBLICATIONS

B. Koley and C. A. Alexandra, "Recent Trends in Aerodynamic Parameter Estimation: a Review of Different Methods along with Their Advantages and Disadvantages," 2021 2nd International Conference on Range Technology (ICORT), Chandipur, Balasore, India, 2021, pp. 1-5. (Year: 2021).*

F. Jaffar, T. Farid, M. Sajid, Y. Ayaz and M. J. Khan, "Prediction of Drag Force on Vehicles in a Platoon Configuration Using Machine Learning, " in IEEE Access, vol. 8, pp. 201823-201834, 2020. (Year: 2020).*

M. Usama, A. Arif, F. Haris, S. Khan, S. K. Afaq and S. Rashid, "A Data-Driven Interactive System for Aerodynamic and User-centred Generative Vehicle Design," 2021 International Conference on Artificial Intelligence (ICAI), Islamabad, Pakistan, 2021, pp. 119-127. (Year: 2021).*

Jacob, S. et al., "Deep Learning for Real-Time Aerodynamics Evaluations of Arbitrary Vehicle Shapes," SAE International Journal of Passenger Vehicle Systems, Aug. 2021, 12 pages.

Liu, Q. et al., "Learning Part Segmentation through Unsupervised Domain Adaptation from Synthetic Vehicles," 2022 IEEE/CVF Conference on Computer Vision and Pattern Recognition (CVPR), Jun. 18-24, 2022, New Orleans, LA, USA, IEEE, 12 pages.

Hariram, A. et al., "A Study in Options to Improve Aerodynamic Profile of Heavy-Duty Vehicles in Europe," Sustainability, vol. 11, No. 19, Oct. 2019, MDPI, 23 pages.

He, P. et al., "Truck Taxonomy and Classification Using Video and Weigh-In Motion (WIM) Technology Final Report," The Florida Department of Transportation, Transportation Data and Analytics Office, May 2019, 76 pages.

Yang, L. et al., "Vehicle parts detection based on Faster—RCNN with location constraints of vehicle parts feature point," Proceedings of the SPIE, vol. 10609, id. 106091J, 2018, 7 pages.

Extended European Search Report for European Patent Application No. 23150774.0, mailed Jun. 7, 2023, 10 pages.

* cited by examiner

AIR DRAG OF A VEHICLE

PRIORITY APPLICATIONS

The present application claims priority to European Patent Application No. 23150774.0, filed on Jan. 9, 2023, and entitled "AIR DRAG OF A VEHICLE," which is incorporated herein by reference in its entirety.

TECHNICAL FIELD

The disclosure relates generally to a computer system, a computer-implemented method, a vehicle, a computer program product, a control system and a non-transitory computer-readable storage medium. In particular aspects, the disclosure relates to air drag of a vehicle. The disclosure can be applied in heavy-duty vehicles, such as trucks, buses, marine vessels and construction equipment. Although the disclosure may be described with respect to a particular vehicle, the disclosure is not restricted to any particular vehicle.

BACKGROUND

There is ongoing work aimed at optimizing and reducing energy consumption of a vehicle. Energy consumption is influenced by a number of parameters, aerodynamic drag or air drag is one of them. Air drag may be described as a force acting in opposition to the relative motion of an object passing through air. Reducing the air drag on the vehicle will reduce the energy required to propel the vehicle. The external design on the vehicle together with all external and/or protruding parts mounted on the vehicle may influence the air drag. Trailer design in combination with how it is mounted to the towing vehicle is another example of what is affecting air drag of the vehicle.

It is a strive to develop further improved technology relating to air drag of vehicles.

SUMMARY

According to a first aspect of the disclosure, there is provided a computer system comprising a processor device configured to

- obtain at least one image of a vehicle, wherein the at least one image comprises at least one air drag affecting portion of the vehicle affecting the air drag of the vehicle;
- estimate an air drag of the vehicle comprising the at least one air drag affecting portion using a machine learning algorithm;
- identify the at least one air drag affecting portion in the at least one image; and to
- estimate an impact that the at least one air drag affecting portion has on the vehicle's air drag and energy consumption.

The first aspect of the disclosure may seek to improve handling of air drag and energy consumption of a vehicle. A technical benefit may include that handling of air drag and energy consumption of a vehicle is improved. Another technical benefit may be that it enables to identify air drag problems and improves energy efficiency of the vehicle. Using a machine learning algorithm provide an estimate of the air drag that is accurate. Furthermore, the estimation of the air drag is performed fast thanks to the machine learning algorithm.

According to a second aspect of the disclosure, there is provided a computer-implemented method, comprising:

- obtaining, by a processor device of a computer system, at least one image of a vehicle, wherein the at least one image comprises at least one air drag affecting portion of the vehicle affecting the air drag of the vehicle;
- estimating, by the processor device, an air drag of the vehicle comprising the at least one air drag affecting portion using a machine learning algorithm;
- identifying, by the processor device, the at least one air drag affecting portion in the at least one image; and
- estimating, by the processor device, an impact that the at least one air drag affecting portion has on the vehicle's air drag and energy consumption.

Technical benefits of the second aspect of the disclosure are largely analogous to the technical benefits of the first aspect of the disclosure. It shall also be noted that all examples of the second aspect of the disclosure are combinable with all embodiments of the first aspect of the disclosure, and vice versa.

In some examples, the method may comprise:

- determining, by the processor device, a change in vehicle setup based on the impact that the at least one air drag affecting portion has on the vehicle's air drag and energy consumption, wherein the determined change is associated with a reduced air drag and reduced energy consumption.

A technical benefit may include that the air drag and energy consumption is reduced. A change in vehicle setup may be to replace the air drag affecting portion with another similar air drag affecting portion that has less impact on the air drag and energy consumption than the current air drag affecting portion, it may be to completely remove the air drag affecting portion, it may be to change a position of the air drag affecting portion etc.

In some examples, the machine learning algorithm may be pre-trained using data and other images of other vehicles with different vehicle setup in combination with known air drag. A technical benefit may include that the estimated air drag has high accuracy since data and other images of other vehicles with different vehicle setup is used in combination with known air drag.

In some examples, the method may comprise:

- determining, by the processor device, that quality of the at least one image is below a quality threshold or that it has reached or is above the quality threshold.

A technical benefit may include that image(s) of low quality, i.e. quality below the quality threshold, may be discarded or their quality may be improved before being used in the estimation. Possible errors in these images will be removed before being used in the estimation such that errors will not affect the estimation. The estimation will therefore be of high quality and it will be reliable.

In some examples, the method may comprise:

- when a plurality of images is obtained, determining, by the processor device, that a quantity of the plurality of images is below a quantity threshold or that it has reached or is above the quantity threshold.

A technical benefit may include that the estimation will only be performed with a sufficient number of images, i.e., when the quantity is above the quantity threshold. If the quantity is below the quantity threshold, additional images will be obtained. Thus, errors in the estimation due to a quantity being below the quantity threshold will be removed or at least reduced. Ensuring that the quantity is at or above the quantity threshold increases the quality, accuracy and reliability of the estimation.

In some examples, the method may comprise:

Providing, by the processor device, information associated with the estimated impact and estimated air drag to a display unit.

A technical benefit may include that a user or operator of the vehicle may easily obtain the information and take the necessary actions to handle the air drag.

In some examples, the at least one image may be obtained from an image capturing device located offboard the vehicle. For example, the image capturing device may be comprised in a user equipment, e.g., a mobile phone, a tablet computer etc., used by a user or operator of the vehicle. When using an image capturing device located offboard the vehicle, an image of the whole vehicle may be obtained and possibly also in one image, as compared to image capturing devices located onboard the vehicle. An image capturing device located offboard the vehicle is easy to use and access.

According to a third aspect of the disclosure, there is provided a vehicle comprising a processor device to perform the method of the second aspect. Technical benefits of the third aspect of the disclosure are largely analogous to the technical benefits of the first aspect and the second aspect of the disclosure. It shall also be noted that all examples of the third aspect of the disclosure are combinable with all embodiments of the first aspect and the second aspect of the disclosure, and vice versa.

According to a fourth aspect of the disclosure, there is provided a computer program product comprising program code for performing, when executed by a processor device, the method of the second aspect. Technical benefits of the fourth aspect of the disclosure are largely analogous to the technical benefits of the first, second and the third aspect of the disclosure. It shall also be noted that all examples of the fourth aspect of the disclosure are combinable with all embodiments of the first, second and the third aspect of the disclosure, and vice versa.

According to a fifth aspect of the disclosure, there is provided a control system comprising one or more control units configured to perform the method of the second aspect. Technical benefits of the fifth aspect of the disclosure are largely analogous to the technical benefits of the first, second, third and the fourth aspect of the disclosure. It shall also be noted that all examples of the fifth aspect of the disclosure are combinable with all embodiments of the first, second, third and the fourth aspect of the disclosure, and vice versa.

According to a sixth aspect of the disclosure, there is provided a non-transitory computer-readable storage medium comprising instructions, which when executed by a processor device, cause the processor device to perform the method of the second aspect. Technical benefits of the sixth aspect of the disclosure are largely analogous to the technical benefits of the first, second, third, fourth and the fifth aspect of the disclosure. It shall also be noted that all examples of the fifth aspect of the disclosure are combinable with all embodiments of the first, second, third, fourth and the fifth aspect of the disclosure, and vice versa.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
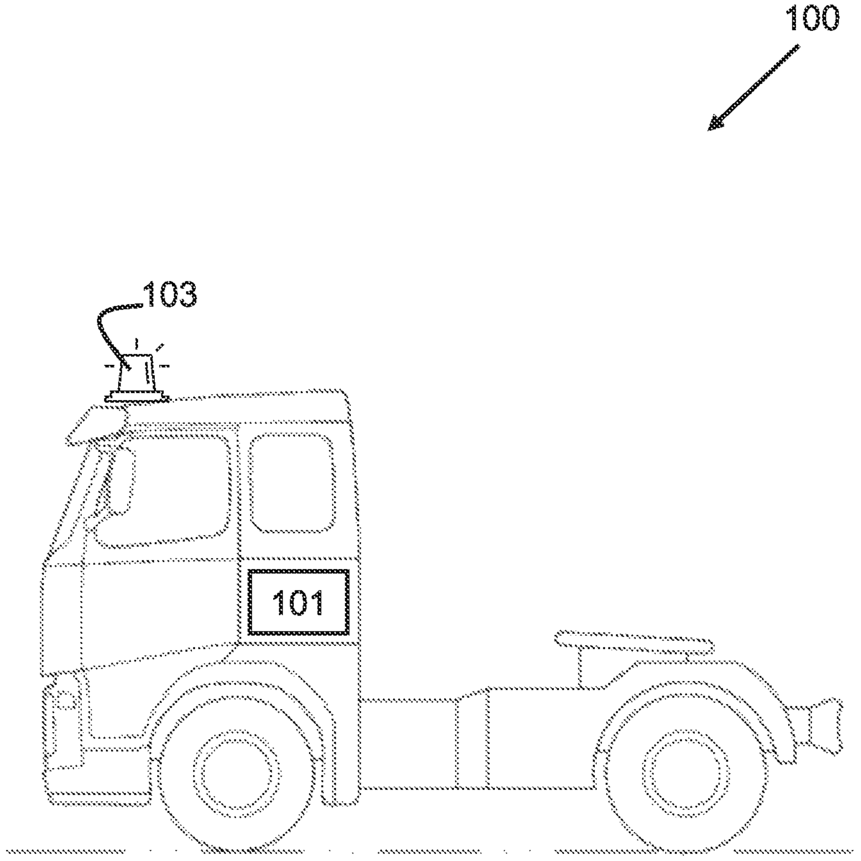
FIG. 1 is an exemplary illustration of a vehicle, according to one example.

FIG. 1 is an exemplary illustration of a vehicle 100. The vehicle 100 may be a heavy-duty vehicle, such as truck, bus, marine vessel and construction equipment. Although the disclosure may be described with respect to a particular vehicle 100, the disclosure is not restricted to any particular vehicle.

The vehicle 100 may comprise a control unit 101. The control unit 101 may be comprised in a control system, and the control system may comprise one or more control units 101. The control unit 101 may comprise a processor device 602 (ref. number 602 is found in FIG. 6), or the control unit 101 may be the processor device 602. The control system may be a computer system 600 (ref. number 600 is found in FIG. 6) comprising the processor device 602.

The control unit 101 may be completely comprised in the vehicle 100, as exemplified in FIG. 1. A first part of the control unit 101 may be comprised in the vehicle 100 and a second part of the control unit 101 may be located offboard the vehicle 100, e.g. in a central server, in a cloud server etc. The control unit 100 may be completely comprised in an offboard location, e.g., a central server, a cloud server etc.

The vehicle 100 comprises at least one air drag affecting portion 103. The term at least one refers to that the vehicle 100 comprises one or more air drag affection portions 103, i.e., that the vehicle 100 comprises n number of air drag affection portions 103, where n is a positive integer. For the sake of simplicity, the term air drag affection portion 103 may be used herein when referring to at least one air drag affection portion 103.

The air drag affecting portion 103 may be of any suitable type. FIG. 1 illustrates an example where the air drag affecting portion 103 is a lamp mounted on top of the outside of the vehicle cabin. In another example, the air drag affecting portion 103 may be an air deflector, it may be a trailer connected to a towing vehicle, side mirrors, signal horns, warning lights or any other suitable air drag affection portion. The distance between the towing vehicle and the trailer may affect the air drag, the size and/or shape of the trailer may affect the air drag etc. The air drag affecting portion 103 may be located at any suitable position on the vehicle 100, i.e., on the outside of the vehicle 100.

Figure 2:
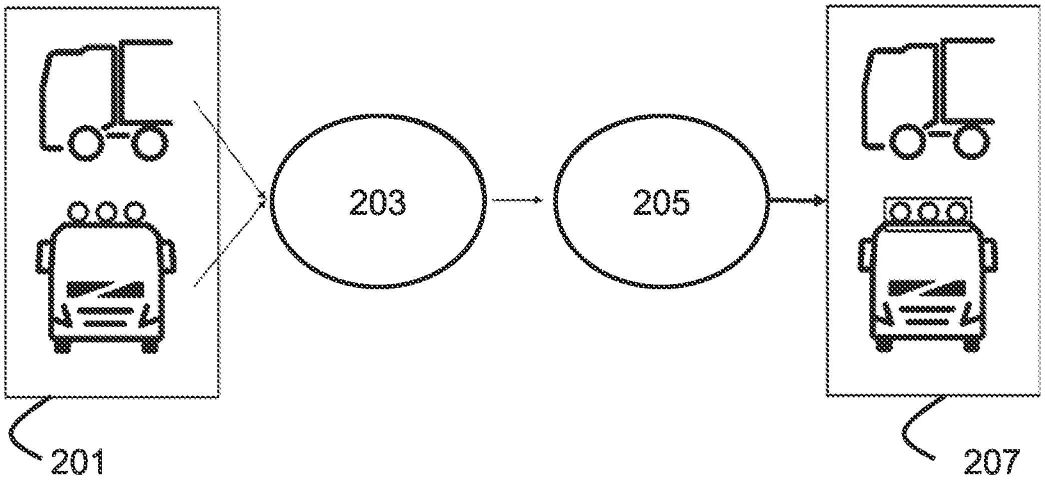
FIG. 2 is an exemplary illustration of a method, according to one example.
Figure 3:
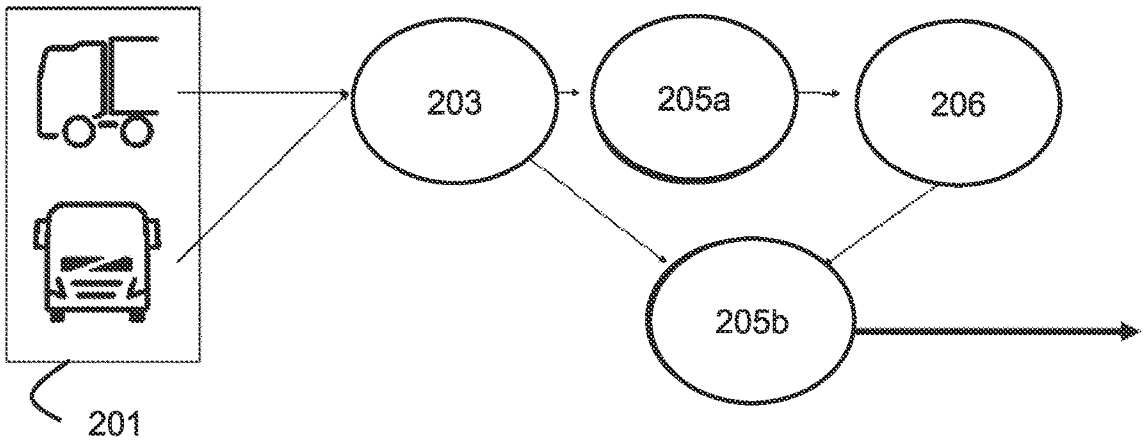
FIG. 3 is an exemplary illustration of a method, according to one example.
Figure 4:
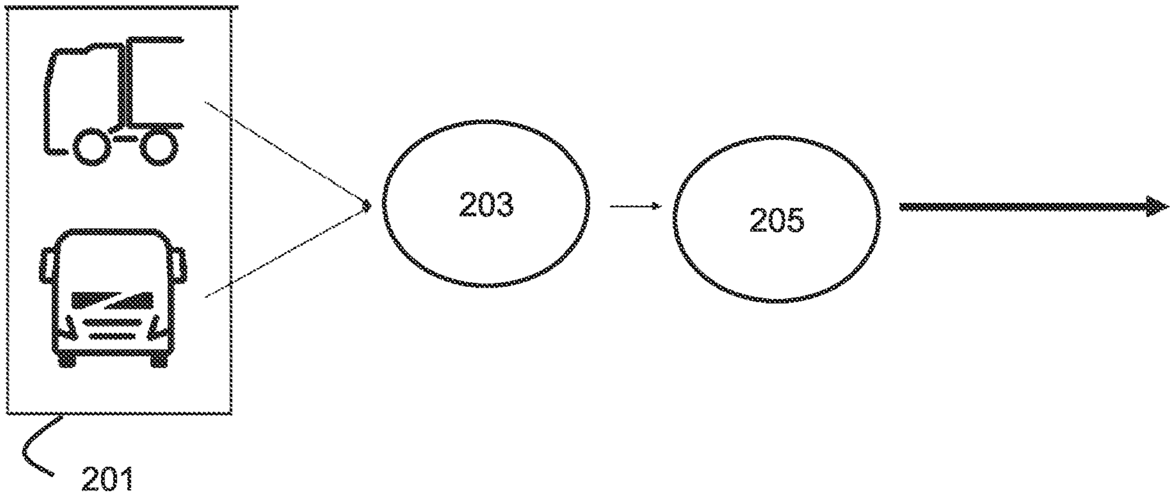
FIG. 4 is an exemplary illustration of a method, according to one example.

FIG. 2, FIG. 3 and FIG. 4 are exemplary illustrations of a method, according to one example. The method comprises at least one of the following steps, which steps may be performed in any suitable order than described below:

Step 201: At least one image of the vehicle 100 is obtained. The image may be captured by an image capturing device (not shown in FIG. 2) located offboard the vehicle 100. The image may be provided from the image capturing device to the control unit 103 and/or the processor device 602. The image may be provided from the image capturing device upon request from the control unit 103 and/or the processor device 602, it may be provided at regular time intervals, or it may be provided when an image has been captured.

The image capturing device may be any suitable device arranged to capture an image, e.g., still and/or moving images. The image capturing device may be comprised in a user equipment such as a mobile phone, a tablet computer or any other handheld unit, it may be comprised in a drone, it may be comprised in a stationary unit mounted on e.g., a rack, a building etc.

The term at least one image refers to that there may be one or more images captured by the image capturing device and provided to the control unit 103 and/or the processor device 602, i.e., m number of images, where m is a positive integer.

The at least one image is an image of substantially the whole vehicle 100. The term substantially refers to that the images if of the whole vehicle 100 possibly with some tolerance. The at least one image may be taken from any suitable angle of the vehicle 100. The at least one image may illustrate the front of the vehicle 100, the side of the vehicle etc. In some examples, there may be one image of the front of the vehicle 100 and another image of the side of the vehicle 100, as exemplified in FIG. 2.

Step 203: Image pre-processing may be performed. The pre-processing may be performed by the control unit 103 and/or the processor device 602. The pre-processing may comprise to check if the quality of the at least one image is sufficient, i.e., to determine whether the quality of the at least one image is below a quality threshold or that it has reached or is above the quality threshold. When the quality is below the quality threshold, then the quality may be determined to be not sufficient or not good enough to be used in the next step. When the quality has reached or is above the quality threshold, then the quality may be determined to be sufficient or good enough to be used in the next steps. The quality of the image may be determined based on one or more of: the lighting conditions in the image, e.g. dynamic range, sharpness, noise, distortion, information indicating whether or not the complete vehicle 100 is contained within the image, information indicating whether or not it is possible to identify the vehicle 100 within the image, or any other suitable information.

The quality threshold may be predetermined, or it may be dynamically set and possibly changed during the performance of the method described herein.

When the quality is below the quality threshold, the control unit 103 and/or the processor device 602 may determine to improve the quality of the image or to discard the image having too low quality. The quality of the image may be improved using any suitable image processing methods. After quality improvement has been made, the quality of the improved image may again be compared to the quality threshold.

When a plurality of images of the vehicle 100 is obtained, then it may be checked if the quantity of the plurality of images is below a quantity threshold or if it has reached or is above the quantity threshold. When the quantity is below the quantity threshold, then the control unit 103 and/or the processor device 602 may determine that more images need to be captured, and send a request to the image capturing device to take more images. The request may comprise information about how many images the image capturing device should take. The image capturing device consequently takes more images and provides them to the control unit 103 and/or the processor device 602. If the request does not comprise information about how many images to be taken, the image processing device may take a predetermined number of images or an arbitrary number of images. When the additional images have been obtained by the control unit 103 and/or the processor device 602, the number of images may again be compared to the quantity threshold. This may be performed in a loop until a sufficient number of images of the vehicle 100 has been obtained.

The quantity threshold may be predetermined, or it may be dynamically set and possibly changed during the performance of the method described herein. For example, with only one image it may be difficult to measure distance to and between objects making it much more difficult to estimate the air drag. Also, the viewing angle affects the results. If all images are taken from the exact same position with the same angle, it may not be possible to reconstruct the image in 3D and therefore the estimation will not be as accurate. Depending on the difference between viewing angle and how much of the vehicle 100 is captured in each image, the number of images required may vary. It may probably be possible to do a simple prediction with only one image, but the uncertainties may be much higher.

Step 205: A machine learning algorithm may be applied on the at least one images to estimate the air drag of the vehicle 100, i.e., the air drag of the whole vehicle 100. Consequently, the machine learning algorithm is implemented and executed on the control unit 103 and/or the processor device 602.

The machine learning algorithm may be pre-trained using data and other images of other vehicles 100 with different vehicle setup in combination with known air drag.

The input to the machine learning algorithm may be historic data, e.g., historic or previous estimations of air drag of the vehicle 100 or of other vehicles 100. The output of the machine learning algorithm is the estimated air drag of the vehicle 100.

The machine learning algorithm may be based on deep learning and, for image processing, convolutional neural networks.

As exemplified in FIG. 3, there may be two machine learning algorithms, or the algorithm may comprise two machine learning sub-algorithms. In the following, these two algorithms will be referred to as a first machine learning algorithm **205*a* and a second machine learning algorithm 205*b*. The two machine learning algorithms 205*a*, 205*b* may be performed in parallel and at the same time, or they may be performed one after the other. Input to the two machine learning algorithms is the at least one images of the vehicle 100, possibly after it has been pre-processed in step 203**.

The first machine learning algorithm **205*a* may be referred to as a classification algorithm. The first machine learning algorithm 205*b* is arranged to, based on the at least one image of the vehicle 100, classify the vehicle 100 in at least one vehicle class and to point it out in an air drag resistance database 206. The first machine learning algorithm 205***b* is arranged to, based on the at least one image of the vehicle 100, classify the at least one air drag affecting portion 103 in the air drag resistance database 206. The air drag resistance database 206 comprises air drag resistance data. The air drag resistance data is associated with one particular vehicle 100 or for a plurality of vehicles 100, and/or with at least one air drag portions 103. There may be one air drag resistance database 206 comprising air drag resistance data for both the vehicle 100 and the at least one air drag portion 103, or there may be a first air drag resistance database comprising air drag resistance data for the vehicle 100 and a second air drag resistance database comprising air drag resistance data for the at least one air drag portion 103.

The classes may be based on any suitable vehicle parameter, for example chassis type, vehicle configuration, vehicle shape, at least one air drag affecting portion 103 etc. The at least one air drag affecting portion 103 may be described as outside mounted equipment which is mounted on the outside of the vehicle and may be for example roof mounted headlights, wind advisor etc. There may be a vehicle class in which the vehicle 100 is classified, and an air drag affection portion class in which the at least one air drag affecting portion 103 is classified. There may be predefined classes, and/or the classes may be dynamically created. Completely new vehicles and/or at least one air drag affecting portion 103 may be classified in a class which is nearest or a most similar class. For example, if a new vehicle 100 and/or a new at least one air drag affecting portion 103 does not belong to a predefined class, then the new vehicle 100 and/or new at least one air drag affecting portion 103 may be determined to belong 70% to a first class, 25% to a second class and 5% to a third class.

The air drag resistance database 206 may be predetermined, i.e., it may be created before the first machine learning algorithm 205*a* is executed for the first time. Data comprised in the air drag resistance database 206 may be obtained from already existing sources together with creation of new data from for example, wind tunnel testing, but also synthetic data from more advanced computer simulations. The air drag resistance database 206 may be continuously updated, i.e., the air drag resistance database 206 may not be static but rather built upon during some time.

The second machine learning algorithm 205*b* is arranged to enhance the air drag resistance data from the air drag resistance database 206 by combing that data together with the at least one image of the vehicle 100. The output of the second machine learning algorithm 205 is the air drag resistance value of the whole vehicle 100, including the at least one air drag portion 103.

The air drag resistance data is enhanced in that the air drag resistance database 206 is able to return an air resistance for a combination of vehicle 100 and air drag affecting portions 103. If the given combination of vehicle 100 and air drag affecting portion 103 is not comprised in the air drag resistance database 206, the air drag resistance database 206 may offer to return its closest match. By having a Machine Learning (ML) algorithm trained on the air drag resistance data in the air drag resistance database 206, the information in the air drag resistance database 206 is generalized so that the ML algorithm may give an estimation of the air drag even for a combination of vehicle 100 and air drag affecting portion 103 it has not seen before. The estimate may be better than just returning the closest match from the air drag resistance database 206.

The machine learning algorithm may be described as a type of artificial intelligence (AI). The machine learning algorithm automatically learns and improves from previous executions of the algorithm without being explicitly instructed to do so. The machine learning algorithm uses historic data as input to provide new output data. A machine learning algorithm may be described as aiming to imitate the human brain when it comes to processing of data. The machine learning algorithm may generalize, e.g., it may perform predictions on air drag affection portions 103 that it previously has not handled or made predictions on.

A technical benefit of using a machine learning algorithm is that the accuracy of the estimation is improved, as compared to not using the machine learning algorithm. A machine learning algorithm is an efficient algorithm, its time consumption is low, and it provides outputs and results of high accuracy, i.e., accuracy above a threshold.

Step 207: The control unit 103 and/or the processor device 602 estimates an impact that the at least one air drag affecting portion 103 has on the vehicle's air drag and energy consumption. The impact may be estimated using a machine learning algorithm.

The input to step 207 may be the air drag resistance value, as exemplified in FIG. 3 and FIG. 4. The energy may be electric energy, it may be fuel such as diesel, petrol, it may be gas, it may be fuel cell energy, or any other suitable energy type arranged to power the vehicle 100 etc. In addition to the energy consumption, the at least one air drag affection portion 103 may have an impact on, for example urea that is added to the fuel.

As exemplified in FIG. 2, the impact may comprise to identify the disturbance, i.e., to identify the air drag affection portion 103. The impact may comprise to determine a potential energy saving, for example measured in %, that may be obtained by making changes to the identified at least one air drag affecting portion 103, e.g., removing the air drag affecting portion 103, replacing it with another and less air drag influencing portion etc.

Information associated with the estimated impact and estimated air drag may be provided to a display unit to be viewed by a user or an operator. The display unit may be a standalone display unit, or it may be comprised in any suitable unit, e.g. a user equipment such as a mobile phone, a tablet computer or any other suitable handheld unit, it may an onboard vehicle display, it may be comprised in a stationary computer located at a central location etc.

FIG. 2 and FIG. 4 may be summarized as follows:

At least one image is obtained from the image capturing device, step 201.

The at least one image may be pre-processed and evaluated if quality and quantity is good enough, step 203.

The at least one image, possibly pre-processed, are fed to the machine learning algorithm which makes an identification of disturbances, i.e., it identifies the air affecting portions 103, step 205. The machine learning algorithm is pre trained on images from different vehicle combinations in combination with known air drag resistance values. The data is then used together with an estimator to give the energy consumption impact.

The at least one image is brought back to the user with identified areas and information about potential savings if corrected, step 207.

FIG. 3 may be summarized as follows:

At least one image is obtained from the image capturing device, step 201.

The at least one image, possibly pre-processed, are fed to the machine learning algorithm which makes an identification of disturbances, i.e., it identifies the air affecting portions 103, step 205. The machine learning algorithm is pre-trained on images from different vehicle combinations in combination with known air drag resistance values. The data is then used together with an estimator to give the energy consumption impact.

The first machine learning algorithm, i.e., the classification algorithm, may classify the vehicle 100 and points it out in the air drag resistance database, step 205*b*.

The second machine learning algorithm may enhance the value from the air drag resistance database by combing that data together with the image input, step 205*b*.

Figure 5:
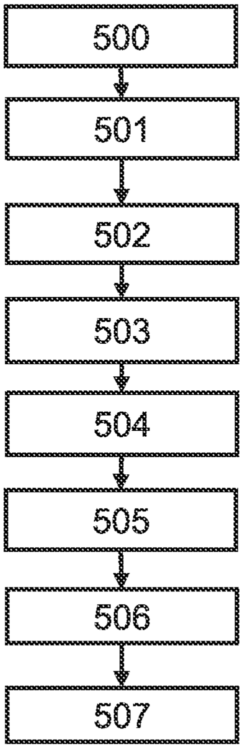
FIG. 5 is an exemplary flow chart illustrating a method, according to one example.

FIG. 5 is an exemplary flow chart illustrating a method, according to one example. The method may be a computer-implemented method. The method may be performed by the control unit 101 or a control system. The method may be performed by the processor device 602 of the computer system 600. The method comprises at least one following steps, which steps may be performed in any suitable order than described below:

Step 500: This step corresponds to step 201 in FIG. 2. The control unit 101, the control system or the processor device 602 obtains, at least one image of a vehicle 100. The at least one image comprises at least one air drag affecting portion 103 of the vehicle 100 affecting the air drag of the vehicle 100. The at least one image may be obtained from an image capturing device located offboard the vehicle 100.

Step 501: The control unit 101, the control system or the processor device 602 may determine that quality of the at least one image is below a quality threshold or that it has reached or is above the quality threshold.

Step 502: When a plurality of images is obtained, the control unit 101, the control system or the processor device 602 may determine that a quantity of the plurality of images is below a quantity threshold or that it has reached or is above the quantity threshold.

Step 503: This step corresponds to steps 205, 205*a*, 205*b* in FIG. 2. The control unit 101, the control system or the processor device 602 estimates an air drag of the vehicle 100 comprising the at least one air drag affecting portion 103 using the machine learning algorithm.

The machine learning algorithm may be pre-trained using data and other images of other vehicles 100 with different vehicle setup in combination with known air drag.

Step 504: This step corresponds to step 207 in FIG. 2. The control unit 101, the control system or the processor device 602 identifies the at least one air drag affecting portion 103 in the at least one image.

Step 505: This step corresponds to step 207 in FIG. 2. The control unit 101, the control system or the processor device 602 estimates an impact that the at least one air drag affecting portion 103 has on the vehicle's air drag and energy consumption.

Step 506: The control unit 101, the control system or the processor device 602 may determine a change in vehicle setup based on the impact that the at least one air drag affecting portion 103 has on the vehicle's air drag and energy consumption. The determined change may be associated with a reduced air drag and reduced energy consumption.

Step 507: The control unit 101, the control system or the processor device 602 may provide information associated with the estimated impact and estimated air drag to a display unit.

A computer system 600 comprising a processor device 602 configured to:

obtain at least one image of a vehicle 100, wherein the at least one image comprises at least one air drag affecting portion 103 of the vehicle 100 affecting the air drag of the vehicle 100;

estimate an air drag of the vehicle 100 comprising the at least one air drag affecting portion 103 using a machine learning algorithm;

identify the at least one air drag affecting portion 103 in the at least one image; and to estimate an impact that the at least one air drag affecting portion 103 has on the vehicle's air drag and energy consumption.

The vehicle 100 comprises the control unit 101, the control system or the processor device 602 to perform the method described herein.

A computer program product comprises program code for performing, when executed by the control unit 101, the control system or the processor device 602, the method described herein.

The control system comprises one or more control units 101 configured to perform the method described herein.

A non-transitory computer-readable storage medium comprises instructions, which when executed by the control unit 101, the control system or the processor device 602, cause the control unit 101, the control system or the processor device 602, to perform the method described herein.

Figure 6:
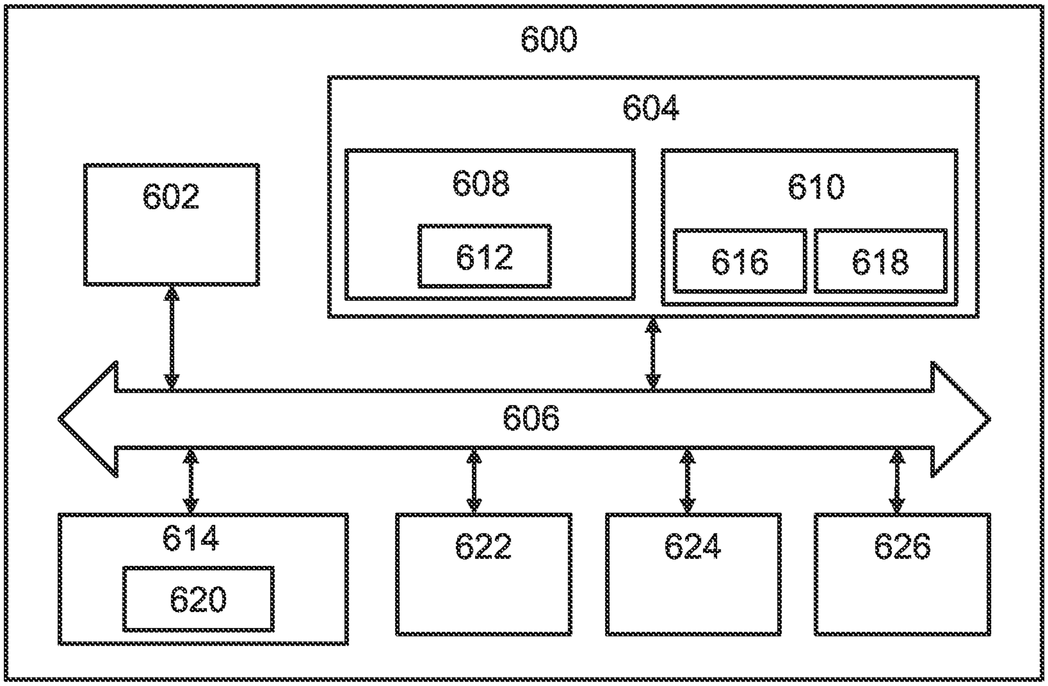
FIG. 6 is a schematic diagram of an exemplary computer system for implementing examples disclosed herein, according to one example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Summarized, many users and operators of vehicle 100 are not aware of the aerodynamic abilities of their vehicle 100. The vehicle 100 may have a poor setup or modifications may have been done that have a severe impact on energy consumption by increased air drag. The present disclosure enables users and operators of the vehicle 100 to identify air drag problems and improve energy efficiency. Today, air drag data may be considered from the delivery state of the vehicle 100, not taking modifications and trailer into consideration. Air drag is an important factor for energy consumption, especially for long haul applications. Today, no tools exist for the users or operators, except general know how acquired through trainings or information sheets.

Furthermore, today it may be challenging to get a good estimate of a vehicle's air drag resistance without using costly and time-consuming wind tunnel testing. Only using known stock data for estimation of air drag do not consider anomality's/modifications.

The present disclosure simplifies the process of estimating air drag while improving the accuracy compared to only using stock data.

The present disclosure utilizes machine learning in combination with at least one images from an image capturing device and/or together with existing and collected data. Given the at least one image of the vehicle 100, it is possible to point out critical elements, i.e., at least one air drag affecting portions 103, of the vehicle 100 and also give an estimate on potential energy savings.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A non-transitory computer system comprising a processor device configured to:

obtain at least one image of a vehicle, wherein the at least one image comprises at least one air drag affecting portion of the vehicle affecting air drag of the vehicle;

estimate the air drag of the vehicle comprising the at least one air drag affecting portion using a first machine learning algorithm and a second machine learning algorithm;

wherein the first machine learning algorithm is arranged to, based on the at least one image of the vehicle, classify the vehicle in at least one vehicle class in an air drag resistance database;

wherein the second machine learning algorithm is arranged to:

based on the at least one image of the vehicle, classify the at least one air drag affecting portion in the air drag resistance database, wherein the air drag resistance database comprises air drag resistance data; and enhance the air drag resistance data from the air drag resistance database by combing the air drag resistance data together with the at least one image of the vehicle returning an air resistance for a combination of vehicle and air drag affecting portions; and identify the at least one air drag affecting portion in the at least one image; and estimate an impact the at least one air drag affecting portion has on the air drag and energy consumption of the vehicle, wherein the impact is estimated by using the enhanced air drag resistance data as input.

2. A computer-implemented method, comprising:

obtaining, by a processor device of a computer system, at least one image of a vehicle, wherein the at least one image comprises at least one air drag affecting portion of the vehicle affecting air drag of the vehicle;

estimating, by the processor device, the air drag of the vehicle comprising the at least one air drag affecting portion using a first machine learning algorithm and a second machine learning algorithm;

wherein the first machine learning algorithm is arranged to, based on the at least one image of the vehicle, classify the vehicle in at least one vehicle class in an air drag resistance database;

wherein the second machine learning algorithm is arranged to:

based on the at least one image of the vehicle, classify the at least one air drag affecting portion in the air drag resistance database, wherein the air drag resistance database comprising air drag resistance data; and enhance the air drag resistance data from the air drag resistance database by combing the air drag resistance data together with the at least one image of the vehicle returning an air resistance for a combination of vehicle and air drag affecting portions;

identifying, by the processor device, the at least one air drag affecting portion in the at least one image; and estimating, by the processor device, an impact the at least one air drag affecting portion has on the air drag and energy consumption of the vehicle, wherein the impact is estimated by using the enhanced air drag resistance data as input.

3. The computer-implemented method of claim 2, further comprising:

determining, by the processor device, a change in vehicle setup based on the impact the at least one air drag affecting portion has on the air drag and energy consumption of the vehicle, wherein the determined change is associated with a reduced air drag and reduced energy consumption.

4. The computer-implemented method of claim 2, wherein at least one of the first machine learning algorithm and the second machine learning algorithm is pre-trained using data and other images of other vehicles with different vehicle setups in combination with known air drag.

5. The computer-implemented method of claim 2, further comprising:

determining, by the processor device, that a quality of the at least one image is below a quality threshold or that the quality has reached or is above the quality threshold.

6. The computer-implemented method of claim 2, further comprising:

when a plurality of images is obtained, determining, by the processor device, that a quantity of the plurality of images is below a quantity threshold or that the quantity has reached or is above the quantity threshold.

7. The computer-implemented method of claim 2, further comprising:

providing, by the processor device, information associated with the estimated impact and estimated air drag to a display unit.

8. The computer-implemented method of claim 2, wherein the at least one image is obtained from an image capturing device located offboard the vehicle.

9. A vehicle comprising a processor device to perform the method of claim 2.

10. A non-transitory computer program product comprising program code stored on a non-transitory computer-readable medium for performing, when executed by a processor device, the method of claim 2.

11. A non-transitory control system comprising one or more control units configured to perform the method of claim 2.

12. A non-transitory computer-readable storage medium comprising instructions, which when executed by a processor device, cause the processor device to perform the method of claim 2.

* * * * *